United States Patent
Suzuki et al.

(10) Patent No.: US 9,287,587 B2
(45) Date of Patent: Mar. 15, 2016

(54) SEALED BATTERY CELL AND MANUFACTURING METHOD THEREOF

(75) Inventors: Katsunori Suzuki, Nabari (JP); Yukio Takasaki, Kawasaki (JP); Sho Matsumoto, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 470 days.

(21) Appl. No.: 13/012,528

(22) Filed: Jan. 24, 2011

(65) Prior Publication Data
US 2011/0183163 A1   Jul. 28, 2011

(30) Foreign Application Priority Data
Jan. 25, 2010   (JP) .................. 2010-012973

(51) Int. Cl.
*H01M 2/12* (2006.01)
*H01M 10/0587* (2010.01)
*H01M 10/052* (2010.01)

(52) U.S. Cl.
CPC ........ *H01M 10/0587* (2013.01); *H01M 2/1241* (2013.01); *H01M 2/1247* (2013.01); *H01M 10/052* (2013.01); *Y02E 60/122* (2013.01); *Y02T 10/7011* (2013.01); *Y10T 29/4911* (2015.01)

(58) Field of Classification Search
CPC ...... Y02E 60/122; H01M 2/022; H01M 2/12; H01M 2/1235; H01M 2/1241; H01M 2/1247; H01M 2/0345; H01M 10/04; H01M 10/0422; H01M 10/0431; H01M 2/22; H01M 2/0408; H01M 2/046; H01M 2/0465; H01M 2/0469
USPC ........................................................ 429/56
See application file for complete search history.

(56) References Cited

U.S. PATENT DOCUMENTS

| | | | | |
|---|---|---|---|---|
| 5,464,705 A | * | 11/1995 | Wainwright | 429/61 |
| 5,707,756 A | * | 1/1998 | Inoue et al. | 429/57 |
| 5,821,008 A | * | 10/1998 | Harada et al. | 429/56 |

(Continued)

FOREIGN PATENT DOCUMENTS

| | | |
|---|---|---|
| JP | 5-74432 A | 3/1993 |
| JP | 7-105933 A | 4/1995 |

(Continued)

OTHER PUBLICATIONS

Japanese Office Action including English language translation dated May 22, 2012 (6 pages).

*Primary Examiner* — Ula C Ruddock
*Assistant Examiner* — Lisa S Park
(74) *Attorney, Agent, or Firm* — Crowell & Moring LLP

(57) ABSTRACT

A sealed battery cell including an anti-explosion mechanism disposed between an electrode group and a top cover, and that deforms or cleaves due to elevation of internal pressure in the battery cell, the electrode group being comprised of a positive electrode and a negative electrode that are laminated together; wherein the anti-explosion mechanism includes a diaphragm, a connection plate welded to the diaphragm, and a connection lead welded to the connection plate; and the connection plate includes a thinner portion where a spot at which the connection lead is connected is formed as thin, and a thicker portion where the thinner portion is not formed, and a lower surface of the thinner portion is formed as coincident with a lower surface of the thicker portion, or as hollowed out from the lower surface of the thicker portion.

7 Claims, 5 Drawing Sheets

(56) References Cited

U.S. PATENT DOCUMENTS 5,853,912 A * 12/1998 Naing et al. .................. 429/61
2002/0037456 A1 * 3/2002 Hosoya ...................... 429/231.3

FOREIGN PATENT DOCUMENTS

| JP | 2001-60454 A | 3/2001 |
| JP | 2009-110808 A | 5/2009 |

* cited by examiner

SEALED BATTERY CELL AND MANUFACTURING METHOD THEREOF

INCORPORATION BY REFERENCE

The disclosure of the following priority application is herein incorporated by reference: Japanese Patent Application No. 2010-012973, filed Jan. 25, 2010.

BACKGROUND OF THE INVENTION

1. Field of the Invention

The present invention relates to a sealed battery cell, and to a manufacturing method for a sealed battery cell.

2. Description of Related Art

In a cylindrical sealed battery cell that is representative of a lithium secondary battery cell and so on, it is per se known to provide an anti-explosion mechanism between an electrode group and a top cover. The electrode group includes a positive electrode on which a positive electrode mixture is spread and a negative electrode on which a negative electrode mixture is spread wound together with the intervention of a separator.

With a sealed battery cell that uses an organic type solvent as electrolyte, when a high electrical current flows the electrolyte decomposes due to an overcharge state or a short circuited state of the positive terminal, gas is generated in the interior of the battery cell. Due to this gas that is generated, the pressure internal to the battery cell rises, and this can cause the battery to explode. An anti-explosion mechanism is a mechanism for preventing such explosion or the like of the battery cell due to elevated internal pressure.

The following construction is per se known as a prior art anti-explosion mechanism. An anti-explosion plate (i.e. a diaphragm) is disposed below the inner surface of the top cover (i.e. below its lower surface), and deforms along with elevation of the internal pressure, so that its central portion protrudes outwards towards the top cover. A lead attachment member (i.e. a connection plate) is provided upon the lower surface of this anti-explosion plate, and a connection lead is welded to the lower surface of the lead attachment member (connection plate). An insulating member is interposed between the lead attachment member and the anti-explosion plate, and the lead attachment member and the connection lead are connected together by ultrasonic welding. Furthermore, at the lower surface of the lead attachment member, the connection lead that is connected to a positive electrode collector member is welded.

With this type of construction, if the internal pressure rises, then the continuity between the positive electrode and the top cover is broken due to deformation of the anti-explosion plate, and/or the anti-explosion plate breaks (i.e. cleaves) so that the gas inside the battery cell is vented, and thereby explosion of the battery cell is prevented.

In Japanese Laid-Open Patent Publication Heisei 7-105933, there is disclosed a structure in which a lead attachment member is also endowed with a function of cleaving.

SUMMARY OF THE INVENTION

However, when the connection lead is being welded to the lead attachment member, the junction portion of the lead attachment member deforms so as to bulge upwards towards the anti-explosion plate. The thickness of the insulating member that is interposed between the anti-explosion plate and the lead attachment member is very thin, and the gap between the anti-explosion plate and the lead attachment member at the junction portion is extremely small, for example around 0.5 mm or less. Due to this, when the lead attachment member is deformed by heat and bulges upwards during welding, sometimes this bulged upwards portion may come into contact with the anti-explosion plate.

If the lead attachment member thus comes into contact with the anti-explosion plate, the contact portion of the diaphragm may be damaged, and the electrolyte inside the battery cell may leak to the exterior; and also the anti-explosion mechanism may suffer deterioration or loss of its functioning.

According to the 1st aspect of the present invention, a sealed battery cell comprising an anti-explosion mechanism disposed between an electrode group and a top cover, and that deforms or cleaves due to elevation of internal pressure in the battery cell, the electrode group being comprised of a positive electrode and a negative electrode that are laminated together; wherein the anti-explosion mechanism comprises a diaphragm, a connection plate welded to the diaphragm, and a connection lead welded to the connection plate; and the connection plate comprises a thinner portion where a spot at which the connection lead is connected is formed as thin, and a thicker portion where the thinner portion is not formed, and a lower surface of the thinner portion is formed as coincident with a lower surface of the thicker portion, or as hollowed out from the lower surface of the thicker portion.

According to the 2nd aspect of the present invention, an area of the thinner portion of a sealed battery cell according to the 1st aspect may be formed so as to be larger than the spot or a junction area at which the connection lead is welded.

According to the 3rd aspect of the present invention, the thinner portion of a sealed battery cell according to the 1st aspect may be formed to be 0.1 mm or more thinner than the thicker portion, and to be at least as thick as the connection lead.

According to the 4th aspect of the present invention, it is preferred that in a sealed battery cell according to the 1st aspect, the anti-explosion mechanism further comprises an insulation plate; and the top cover, the diaphragm, the connection plate, and the insulation plate are integrated together by swaging the top cover to the diaphragm and welding the connection plate to the diaphragm in the state in which a peripheral part of the connection plate is fitted into the insulation plate.

According to the 5th aspect of the present invention, the connection lead of a sealed battery cell according to the 4th aspect may be laser welded to the connection plate while the top cover, the diaphragm, the connection plate, and the insulation plate are in an integrated state.

According to the 6th aspect of the present invention, a manufacturing method for a sealed battery cell comprises: a process of manufacturing an anti-explosion mechanism in which a top cover, a diaphragm, a connection plate, and an insulation plate are integrated together in advance; a process of manufacturing an electrode group; a process of putting the electrode group into a cylindrical battery cell container that has a bottom; a process of connecting together the electrode group and the connection plate by a connection member; a process of injecting an electrolyte into the battery cell container; and a process of swaging the anti-explosion mechanism to the battery cell container via a gasket after injection of the electrolyte; wherein: a thinner portion for laser welding is formed on a first surface of the connection plate, the thinner portion being hollowed out at a predetermined area of the first surface facing the diaphragm; and the connection member is laser welded to a second surface of the thinner portion of the connection plate, the second surface being an opposite surface to the first surface of the connection plate.

According to the 7th aspect of the present invention, it is preferred that in a manufacturing method for a sealed battery cell according to the 6th aspect, the connection member is laser welded to the second surface of the thinner portion of the connection plate within an area thereof which is narrower than the predetermined area of the thinner portion.

According to the sealed battery cell of the present invention, even if the connection plate becomes deformed due to welding of the connection lead, it is possible to prevent it coming into contact with the diaphragm, since the junction portion of the connection plate is made in advance as a thinner portion that is hollowed out and thus lower than the region around it.

DESCRIPTION OF THE PREFERRED EMBODIMENTS

Construction of a Cylindrical Sealed Battery Cell

In the following, the sealed battery cell of the present invention will be explained in terms of an embodiment that is a cylindrical type lithium ion secondary battery cell, with referencing to the drawings.

Figure 1:
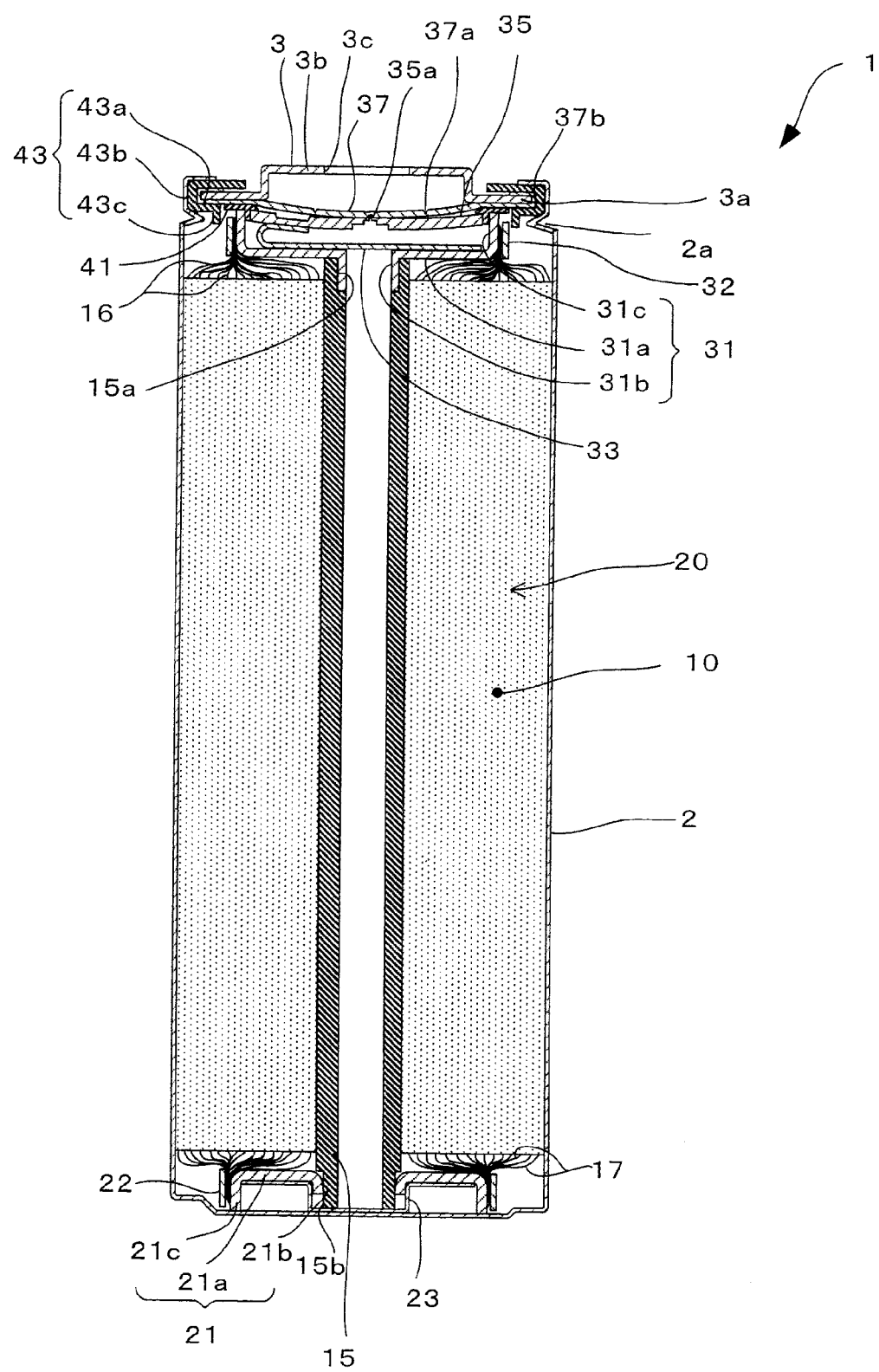
FIG. 1 is a sectional view showing an embodiment of the cylindrical sealed battery cell of the present invention.
Figure 2:
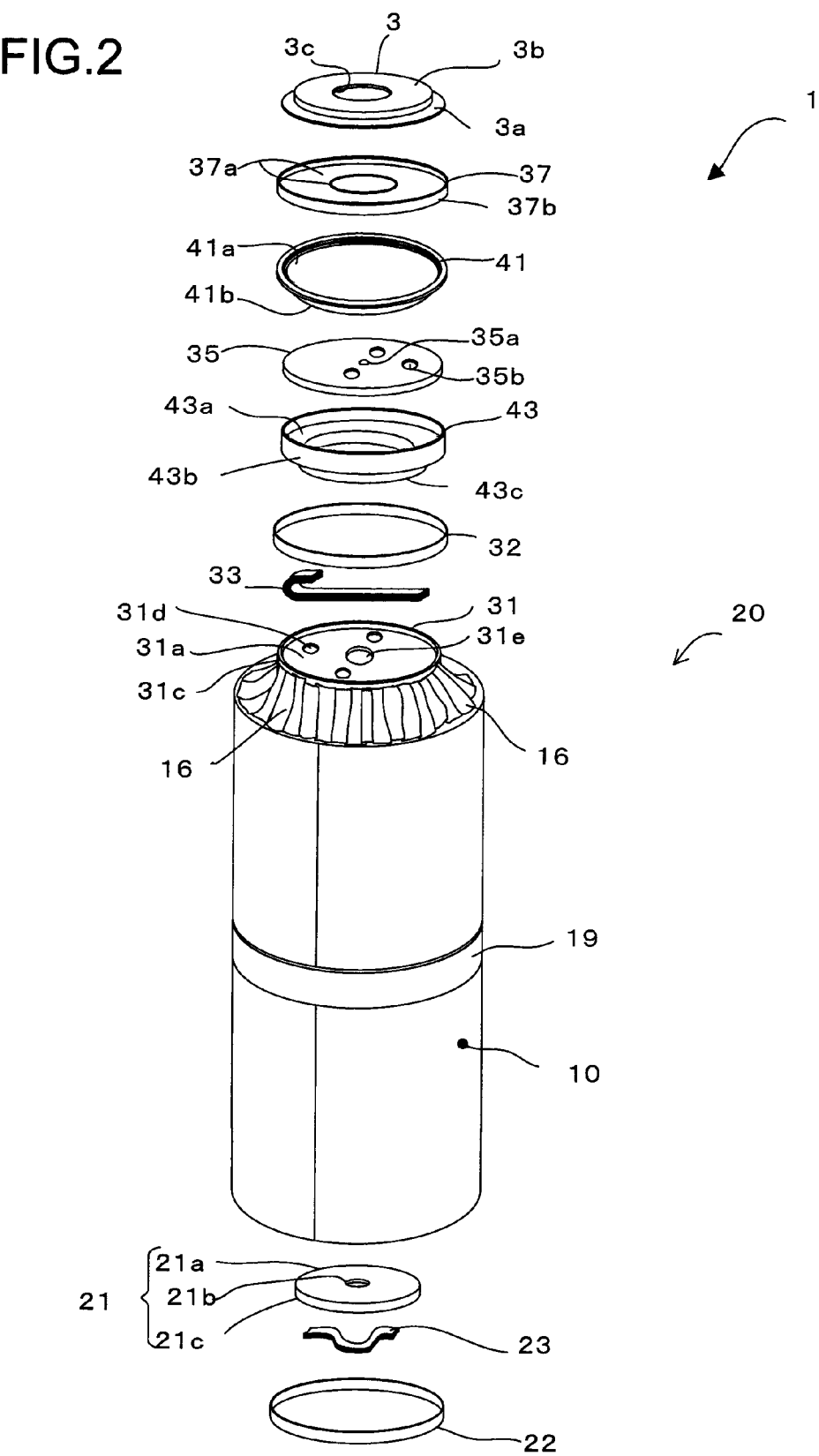
FIG. 2 is an exploded perspective view of the cylindrical sealed battery cell of FIG. 1.

FIG. 1 is a vertical sectional view showing an embodiment of the cylindrical sealed battery cell of the present invention, and FIG. 2 is an exploded perspective view of the cylindrical sealed battery cell shown in FIG. 1.

The cylindrical sealed battery cell 1, for example, may be shaped as a cylinder that has an external shape of diameter 40 mm and a height of 110 mm.

This cylindrical secondary battery cell 1 holds various structural members for electricity generation that will be explained hereinafter in the interior of a cylindrical type battery cell container 2 that has a bottom and a hat type top cover 3. On this cylindrical type battery cell container 2 with a bottom, a groove 2a that projects radially inwards towards the interior of the battery cell container 2 is formed at the upper end portion thereof, that is its open end.

Figure 3:
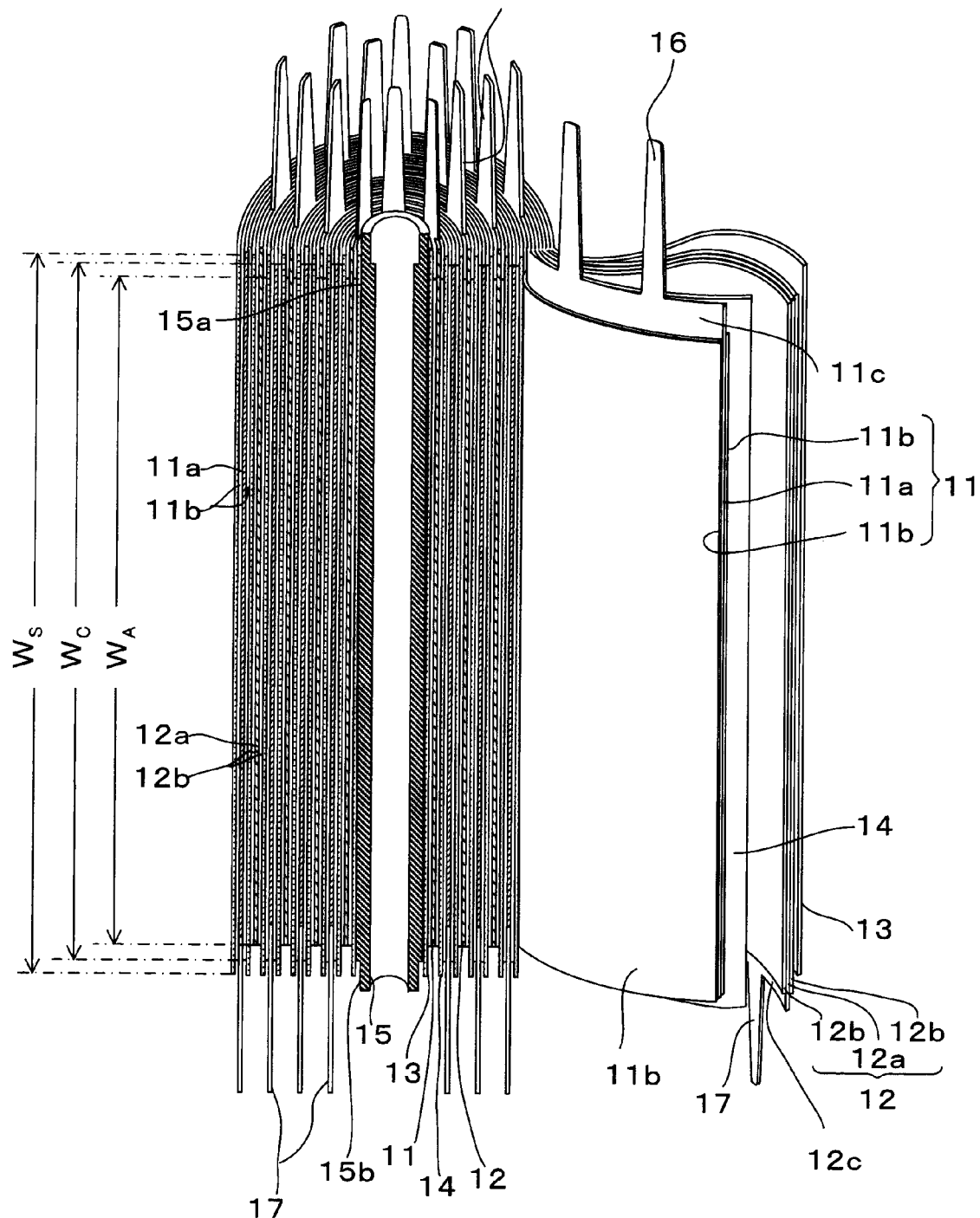
FIG. 3 is a perspective view of an electrode group of FIG. 1, showing it in a partly cut away state so that its details are visible.

An electrode group 10 has a winding core 15 at its central portion, and positive electrode and negative electrode are coiled around this winding core. FIG. 3 is a perspective view showing the detailed structure of the electrode group 10 in a state with a portion thereof cut away. As shown in FIG. 3, this electrode group 10 has a structure in which a positive electrode 11, a negative electrode 12, and first and second separators 13 and 14 between the positive electrode 11 and the negative electrode 12 are coiled around the outside of the winding core 15.

The winding core 15 is shaped as a hollow cylinder, and, at its innermost, the first separator 13 is coiled around and contacts the external peripheral surface of the winding core 15, and then, outside this first separator 13, the positive electrode 11, the second separator 14, and the negative electrode 12 are laminated in that order, and are coiled up. Furthermore, the negative electrode 12 appears on the outside, with the first separator 13 being coiled around it. And, although this is not shown in the figure, the first separator 13 on the outside is held down with adhesive tape 19.

The positive electrode 11 is made from aluminum foil and has an elongated shape, and includes a positive electrode sheet 11a and a processed positive electrode portion in which a positive electrode mixture 11b is applied to both sides of this positive electrode sheet 11a. The edge of the positive electrode sheet 11a along the longitudinal direction, to both sides of which the positive electrode mixture 11b is not applied and along which the aluminum foil is accordingly exposed, constitutes a positive electrode mixture untreated portion 11c that is not treated with the positive electrode mixture. A large number of positive leads 16 are formed integrally at regular intervals upon this positive electrode mixture untreated portion 11c, and project upwards parallel to the winding core 15.

The positive electrode mixture 11b consists of an active positive electrode material, an electrically conductive positive electrode material, and a positive electrode binder. The active positive electrode material is desirably a lithium metal oxide or a lithium transitional metal oxide. For example, lithium cobalt oxide, lithium manganate, lithium nickel oxide, or a compound lithium metal oxide (that includes two or more sorts of lithium metal oxide selected from the lithium metal oxide based on cobalt, nickel, and manganese) may be suggested. The electrically conductive positive electrode material is not particularly limited, provided that it is a substance that can assist transmission to the positive electrode of electrons that are generated in the positive electrode mixture by a lithium occlusion/emission reaction. As examples of a material for this electrically conductive positive electrode mixture, graphite or acetylene black or the like may be suggested.

The positive electrode binder holds together the active positive electrode material and the electrically conductive positive electrode material, and also is capable of adhering together the positive electrode mixture and the positive electrode collector member, and is not particularly limited, provide that it is not greatly deteriorated by contact with the non-aqueous electrolyte. As an example of a material for this positive electrode binder, polyvinylidene fluoride (PVDF) or fluorine-containing rubber or the like may be suggested. The method of making the positive electrode mixture layer is not particularly limited, provided that it is a method of forming the positive electrode mixture upon the positive electrode. As an example of a method for making the positive electrode mixture 11b, the method may be suggested of applying, onto the positive electrode sheet 11a, a solution in which the substances that make up the positive electrode mixture 11b are dispersed.

As a method for applying the positive electrode mixture 11b to the positive electrode sheet 11a, a roll coating method, a slit die coating method or the like may be suggested. As a solvent for the solution in which the positive electrode mixture 11b is to be dispersed, for example, it may be added to N-methylpyrrolidone (NMP) or water or the like and kneaded into a slurry, that is then applied uniformly to both sides of an aluminum foil of thickness, for example, 20 μm; and, after drying, this may be cut up by stamping. The positive electrode mixture 11b may be applied, for example, to a thickness of around 40 μm on each side. When the positive electrode sheet 11a is cut out by stamping, the positive leads 16 are formed integrally therewith at the same time. As for the lengths of the positive leads 16, the one closest to the winding core 15 is formed to be the shortest, and they are formed so as gradually to become longer towards the outside of the roll.

The negative electrode 12 is made from copper foil and has an elongated shape, and includes a negative electrode sheet 12a and a processed negative electrode portion in which a negative electrode mixture 12b is applied to both sides of this negative electrode sheet 12a. Both sides of the lower side edge of the negative electrode sheet 12a along the longitudinal direction, to which the negative electrode mixture 12b is not applied and along which the copper foil is accordingly exposed, constitute a negative electrode mixture untreated portion 12c that is not treated with the negative electrode mixture. A large number of negative leads 17 are formed integrally at regular intervals upon this negative electrode mixture untreated portion 12c, and project downwards in the direction opposite to that in which the positive leads 16 project.

The negative electrode mixture 12b consists of an active negative electrode material, a negative electrode binder, and a thickener. This negative electrode mixture 12b may also include an electrically conductive negative electrode material such as acetylene black or the like. It is desirable to use graphitic carbon as the active negative electrode material. By using graphitic carbon, it is possible to manufacture a lithium ion secondary battery cell that is suitable for a plug-in hybrid vehicle or electric vehicle, for which high capacity is demanded. The method for forming the negative electrode mixture 12b is not particularly limited, provided that it is a method that can form the negative electrode mixture 12b upon the negative electrode sheet 12a. As a method for applying the negative electrode mixture 12b to the negative electrode sheet 12a, for example, the method may be suggested of applying upon the negative electrode sheet 12a a solution in which the constituent substances of the negative electrode mixture 12b are dispersed. As the method for application, for example, a roll coating method, a slit die coating method or the like may be suggested.

As a method for applying the negative electrode mixture 12b to the negative electrode sheet 12a, for example, N-methyl-2-pyrrolidone or water may be added to the negative electrode mixture 12b as a dispersal solvent and kneaded into a slurry, that is then applied uniformly to both sides of a rolled copper foil of thickness, for example, 10 µm; and, after drying, this may be cut up by stamping. The negative electrode mixture 12b may be applied, for example, to a thickness of around 40 µm on each side. When the negative electrode sheet 12a is cut out by stamping, the negative leads 17 are formed integrally therewith at the same time. As for the lengths of the negative leads 17, the one closest to the winding core 15 is formed to be the shortest, and they are formed so as gradually to become longer towards the outside of the roll.

Multi-hole polyethylene film, for example of thickness 40 µm, is used for the separator 13.

Referring to FIG. 1, a stepped portion 15a with a diameter larger than the inner diameter of the winding core 15 is formed on the inner surface of the hollow cylindrical shaped winding core 15 at its upper end portion in the axial direction (the vertical direction in the drawing). The inner diameter of this stepped portion 15a is formed so as to be almost equal to the inner diameter of the winding core 15, and a positive electrode current collecting member 31 is pressed into this stepped portion 15a. This positive electrode current collecting member 31 may, for example, be made from aluminum, and includes a circular disk shaped base portion 31a, a lower cylinder portion 31b, and an upper cylinder portion 31c. The lower cylinder portion 31b projects to face towards the winding core 15 at the surface of this base portion 31a facing the electrode group 10, and is pressed over the inner surface of the stepped portion 15a. The upper cylinder portion 31c projects towards the top cover 3 at the outer peripheral edge. Moreover, apertures 31d are formed in the base portion 31a of the positive electrode current collecting member 31 for emitting gas that is generated in the interior of the battery cell. Yet further, an aperture 31e is formed at the central portion of the base portion 31a of the positive electrode current collecting member 31. This aperture 31e is an opening for insertion of a cylindrical electrode rod (not shown in the drawings) when an electrically conductive negative electrode lead 23 is to be spot welded to the battery cell container 2.

All of the positive leads 16 of the positive electrode sheet 11a are welded to the upper cylinder portion 31c of the positive electrode current collecting member 31. In this case, as shown in FIG. 2, the positive leads 16 are overlapped over one another and joined upon the upper cylinder portion 31c of the positive electrode current collecting member 31. Since each of these positive leads 16 is very thin, accordingly it is not possible for a large electrical current to be taken out by just one of them. Due to this, the large number of positive leads 16 are formed at predetermined intervals over the total length of the upper edge of the positive electrode sheet 11a from the start of its winding onto the winding core 15 to the end of that winding.

Since the positive electrode current collecting member 31 is oxidized by the electrolyte, its reliability can be enhanced by making it from aluminum. When the aluminum on the front surface is exposed by any type of processing, immediately a coating of aluminum oxide is formed upon that front surface, so that it is possible for oxidization by the electrolyte to be prevented due to this layer of aluminum oxide.

Moreover, by making the positive electrode current collecting member 31 from aluminum, it becomes possible to weld the positive leads 16 of the positive electrode sheet 11a thereto by ultrasonic welding or spot welding or the like.

A stepped portion 15b whose outer diameter is smaller than the outer diameter of the winding core 15 is formed upon the external peripheral surface of the lower end portion of the winding core 15, and a negative electrode current collecting member 21 is pressed over this stepped portion 15b and thereby fixed thereto. This negative electrode current collecting member 21 may, for example, be made from copper, and is formed with a circular disk shaped portion 21a, an opening portion 21b, and an external circumferential cylinder portion 21c. The opening portion 21b is an opening that is provided in the disk shaped portion 21a for fitting this negative electrode current collecting member 21 onto the stepped portion 15b of the winding core 15. And the external circumferential cylinder portion 21c projects at the outer peripheral edge of the disk shaped portion 21a so as to face outwards in the bottom portion of the battery cell container 2.

All of the negative leads 17 of the negative electrode sheet 12a are welded to the external circumferential cylinder portion 21c of the negative electrode current collecting member 21 by ultrasonic welding or the like. Since each of these negative leads 17 is very thin, in order to take out a large electrical current, a large number of them are formed over total length of the lower edge of the negative electrode sheet 12a from the start of its winding onto the winding core 15 to the end of its winding, at predetermined intervals.

The negative leads 17 of the negative electrode sheet 12a and the annular pressure member 22 are welded to the external periphery of the external circumferential cylinder portion 21c of the negative electrode current collecting member 21. Since there are a large number of the negative leads 17, they are closely clamped against the external peripheral surface of the external circumferential cylinder portion 21c of the negative electrode current collecting member 21, then the pressure member 22 is wounded over the externally oriented surfaces of the negative leads 17 and temporarily fixed there, and then they are all welded together in that state.

A negative electrode power lead 23 that is made from copper is welded to the lower surface of the negative electrode current collecting member 21.

This negative electrode power lead 23 is welded to the bottom portion of the battery cell container 2. The battery cell container 2 may, for example, be made from carbon steel of thickness 0.5 mm, and its surface is processed by nickel plating. By using this type of material, it is possible to weld the negative electrode power lead 23 to the battery cell container 2 by electric resistance welding or the like.

The positive leads 16 of the positive electrode sheet 11a and the annular pressure member 32 are welded to the external periphery of the upper cylinder portion 31c of the positive electrode current collecting member 31. Since there are a large number of these positive leads 16, they are closely fitted to the external periphery of the upper cylinder portion 31c of the positive electrode current collecting member 31, and then the pressure member 32 is temporarily fitted over the external surfaces of the positive leads 16, and is welded in this state.

By the large number of positive leads 16 of the positive electrode sheet 11a included in the electrode group 10 being welded to the upper cylinder portion 31c of the positive electrode current collecting member 31, thereby the positive electrode current collecting member 31 and the electrode group 10 are integrated into one unit, thus constituting the generating unit 20 (refer to FIG. 2).

Furthermore, the one end portion of a flexible electrically conducting positive electrode lead (connection lead) 33 that is made by laminating together a large number of layers of aluminum foil is joined to the upper surface of the base portion 31a of the positive electrode current collecting member 31 by welding. Since this conducting positive electrode lead 33 is made by laminating together and integrating a plurality of layers of aluminum foil, accordingly it is capable of carrying a large electrical current, and moreover is endowed with flexibility. In other words, while it is necessary to make the thickness of the connection member great in order for it to conduct a high electrical current, if it were to be made from a single metallic plate, its rigidity would become high, and it would lose its flexibility. Accordingly this connection member is made by laminating together a large number of sheets of aluminum foil of very low thickness, thus preserving its flexibility. The thickness of this conducting positive electrode lead 33 may, for example, be 0.5 mm, and it may be made by laminating together 5 sheets of aluminum foil each of thickness 0.1 mm.

An anti-explosion mechanism 30 is provided above the upper cylinder portion 31c of the positive electrode current collecting member 31.

Figure 4:
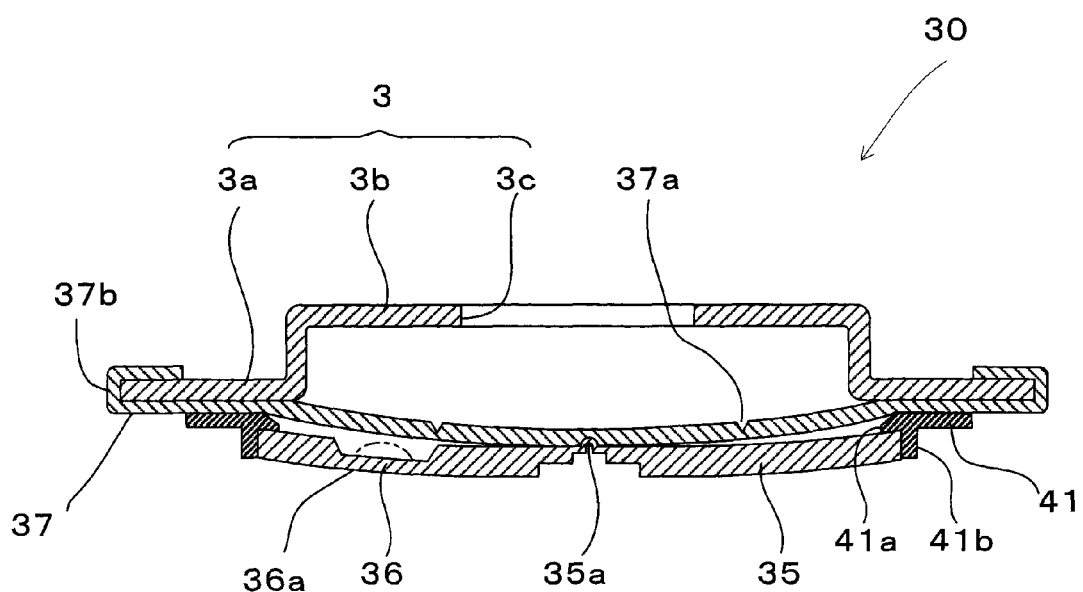
FIG. 4 is an enlarged sectional view of an anti-explosion mechanism shown in FIG. 1.

FIG. 4 is an enlarged sectional view of this anti-explosion mechanism 30; in the following, FIG. 4 will be referred to for the explanation of the anti-explosion mechanism 30.

The anti-explosion mechanism 30 includes an insulation plate 41, a connection plate 35, a diaphragm 37, and the top cover 3.

The insulation plate 41 is shaped as a ring having an inner opening portion 41a, and an annular side edge portion 41b that projects towards the positive electrode current collecting member 31. The inner surface of the upper cylinder portion 31c of the positive electrode current collecting member 31 fits over the outer surface of the annular side edge portion 41b.

The connection plate 35 is made from aluminum alloy, and is almost entirely uniform except for its central portion, while its central portion is bowed down into a slightly lower position and is substantially formed into a dish shape. The thickness of this connection plate 35 may, for example, be around 1 mm. A thinner projecting portion 35a that is made in the shape of a dome is formed at the center of the connection plate 35, and a plurality of opening portions 35b (refer to FIG. 2) and a thinner portion 36 (refer to FIG. 4) are formed around this projecting portion 35a. The opening portions 35b are for venting gas generated internal to the battery cell.

The thinner portion 36 is made as a flat stepped portion whose upper surface is hollowed out from the upper surface of the connection plate 35, and its lower surface 36a (refer to FIG. 4) is formed as flat and coincides with the surface of the region surrounding it. The area of this thinner portion 36 is around 2 mm×5 mm, and it may be formed, for example, by pressing processing or grinding or the like. If the thickness of the connection plate 35 is 1.0 mm, then, for example, the thickness for the thinner portion 36 may be 0.9 mm to 0.5 mm. The connection member 33 is joined to the lower surface of the thinner portion 36a by laser welding or the like.

The projecting portion 35a of the connection plate 35 is joined to the bottom surface of the central portion of the diaphragm 37 by electric resistance welding or friction stir welding. The diaphragm 37 is made from aluminum alloy, and, at the center of the centre portion of the diaphragm 37 as seen in plan view, there is provided a circular cutout 37a. This cutout 37a is a place where a letter-V shape is crushed into the upper surface by pressing, with the remaining material being very thin. This diaphragm 37 is provided in order to ensure the security of the battery cell. If the pressure internal to the battery cell rises, as a first stage, the diaphragm 37 bends upwards, its junction with the projecting portion 35a of the connection plate 35 becomes detached and it breaks away from the connection plate 35, and its electrical continuity with the connection plate 35 is interrupted. And, as a second stage, when the internal pressure rises yet further, the diaphragm 37 ruptures at its cutout 37a, and provides its function of venting the pressurized gas internal to the battery cell.

The diaphragm 37 is fixed by its edge portion to the peripheral portion of the top cover 3. As shown in FIG. 2, the diaphragm 37 has a side portion 37b whose edge portion stands up vertically facing the top cover 3. The top cover 3 is contained within this side portion 37b, and, by a swaging process, this side portion 37b is bent around and fixed to the upper surface of the top cover 3.

The top cover 3 is made from an iron material such as carbon steel or the like and is nickel plated, and is formed in the shape of a hat having a top but no bottom, including a peripheral part 3a shaped as a circular disk that contacts the diaphragm 37, and a cylinder portion 3b that projects upwards from this peripheral part 3a. An opening portion 3c is formed in the cylinder portion 3b. This opening portion 3c is for emitting gas that is generated internally to the battery cell to the exterior, when the diaphragm 37 has broken due to the gas pressure inside the battery cell.

It should be understood that, if the top cover 3 is made from an iron material, then, when connecting it in series to one or more other cylindrical sealed battery cells, it can be joined to another cylindrical sealed battery cell that is also made from an iron material by spot welding.

As described above, for this anti-explosion mechanism 30 is formed as an overall integrated unit by fitting the connection plate 35 into the insulation plate 41, welding the connection plate 35 and the diaphragm 37 together, and swaging the top cover 3 to the peripheral portion of the diaphragm 37.

And one end portion of the connection member 33 is joined to the lower surface 36a of the thinner portion 36 of the connection plate 35 included in the anti-explosion mechanism 30.

To cite one example of a method for performing this joining, one end portion of the connection member 33 is contacted against the lower surface 36a of the thinner portion 36 of the connection plate 35 included in the anti-explosion mechanism 30, and welding is performed by shining a laser against the connection plate 35 from the side of the connection member 33. In this case, the area irradiated by the beam of the laser is made to be smaller than the area of the thinner portion 36. To put it in another manner, the area of the portion to be joined that is irradiated by the laser is smaller than the area of the thinner portion 36a. When the laser is irradiated, the region upon the thinner portion 36 that is irradiated by the laser is deformed by heat, and bulges upwards towards the diaphragm 37 as shown by the broken line in FIG. 4. In the case of a prior art construction in which no thinner portion 36 is formed upon the connection plate 35, due to deformation of the junction portion, sometimes contact takes place between the connection plate 35 and the diaphragm 37. If the connection plate 35 contacts the diaphragm 37 at some spot in this manner, the resistance of the contact portion may become abnormally high. The resistance of the contact portion of the connection plate 35 and the diaphragm 37 may become different from a resistance of the junction portion of the projecting portion 35a and the diaphragm 37, since the projecting portion 35a at which a reliable junction is formed by welding and the junction portion with the diaphragm 37. Due to this, when a high electrical current flows in this type of contact portion, this may entail damage to the contact portion of the diaphragm, leakage of the internal electrolyte, and loss of the function of the anti-explosion mechanism.

However since, with the present invention, the thinner portion 36 whose upper surface has a flat upper surface that has been hollowed out from the upper surface of the connection plate 35 is formed in advance upon the connection plate 35, accordingly it is possible to prevent the junction portion between the connection plate 35 and the connection member 33 from contacting against the diaphragm.

In this case, since the anti-explosion mechanism 30 has a structure in which the top cover 3, the diaphragm 37, and the connection plate 35 are integrated together, accordingly ultrasonic welding is not used as the method for welding the connection member 33 to the lower surface of the connection plate 35. However, while the production efficiency of laser welding is high as compared to that of ultrasonic welding, since the bulging upwards due to thermal deformation is relatively great, accordingly with a prior art type construction it has not been possible to employ laser welding. But, with the present invention, by the upper surface of the connection plate 35 being formed as the hollowed out thinner portion 36, it becomes possible to use laser welding for welding the connection member 33 to the connection plate 35 that is integrated as a portion of the anti-explosion mechanism 30, so that it is possible to enhance the efficiency of production. In this case, not only is the production efficiency of the laser welding method higher than that of ultrasonic welding, but also, due to the fact that the process itself of integrating the anti-explosion mechanism 30 is more efficient than the prior art assembly method, accordingly the efficiency is yet further enhanced.

Furthermore, with the present invention, the junction portion between the connection plate 35 and the connection member 33 is made as the thinner portion 36, and its lower surface 36a is the same surface as that of the surrounding region of the connection plate 35. If a construction were to be adopted in which the junction portion between the connection plate 35 and the connection member 33 were not thinned down, and the connection plate 35 were to be of a uniform thickness and simply curved into a concave shape towards the electrode group 10, then the position at which the junction portion was located would be displaced downwards only by the amount of that curvature. As a result, it would become difficult to ensure adequate clearance between the connection plate 35 and the positive electrode current collecting member 31, and proper accommodation of the connection member 33 would become difficult.

Thus since, according to the present invention, the lower surface 36a of the thinner portion 36 of the connection plate 35 is made to be flat and coincident with the surface of the surrounding portion of the connection plate 35, it is possible to ensure adequate clearance between the connection plate 35 and the positive electrode current collecting member 31 for receiving the connection member 33. Furthermore, this is effective for ensuring the predetermined clearance between the connection plate 35 and the diaphragm 37 in the neighborhood of their junction portion.

Furthermore, since the area of the thinned down portion 36 of the connection plate 35 is larger than the area irradiated by the beam of the laser, it is possible reliably to prevent the thinner portion 36 from bulging upwards towards the diaphragm 37 due to thermal deformation and the connection plate 35 thereby coming into contact with the diaphragm 37.

A gasket 43 is provided that covers the side portion 37b of the diaphragm 37 and its peripheral portion. As shown in FIG. 2, the gasket 43 has an annular base portion 43a, an external circumferential wall portion 43b, and a barrel portion 43c. The external circumferential wall portion 43b is formed to rise almost vertically upwards on the circumferential side edge of the annular base portion 43a. And the barrel portion 43c is formed to drop almost vertically downwards from the internal periphery of the annular base portion 43a.

Moreover, while the details will be described hereinafter, swaging processing is performed by the external circumferential wall portion 43b of the gasket 43 and the battery cell container 2 being bent inwards by pressing or the like, as a result, the diaphragm 37 and the top cover 3 are to be pressed into contact in the axial direction by the base portion 43a and the external circumferential wall portion 43b. Due to this, the anti-explosion mechanism 30 is fixed to the battery cell container 2, and the generating unit 20, in which the positive electrode current collecting member 31 and the electrode group 10 have been integrated, is fixed within the battery cell container 2 so as to be immovable in the axial direction.

A predetermined amount of a non-aqueous electrolyte is injected into the interior of the battery cell container 2. A solution of a lithium salt dissolved in a carbonate type solvent is a preferred example of such a non-aqueous electrolyte that may be used. Examples that may be cited of lithium salts are lithium hexafluorophosphate (LiPF6), lithium tetrafluoroborate (LiBF4), and so on. Furthermore, examples that may be cited of carbonate type solvents are ethylene carbonate (EC), dimethyl carbonate (DMC), propylene carbonate (PC), methyl-ethyl carbonate (MEC), mixtures of two or more solvents selected from the above, and so on.

An example of the method of manufacturing the sealed cylindrical sealed battery cell having the structure described above will now be explained.

—Method of Manufacturing this Cylindrical Sealed Battery Cell—

First, the positive electrode 11 is manufactured by forming the positive electrode mixture 11b and the positive electrode mixture untreated portion 11c on both sides of the positive electrode sheet 11a, and by forming the large number of positive leads 16 integrally with the positive electrode sheet 11a. Furthermore, the negative electrode 12 is manufactured by forming the negative electrode mixture 12b and the processed negative electrode portion 12c on both sides of the negative electrode sheet 12a, and by forming the large number of negative leads 17 integrally with the negative electrode sheet 12a.

And the electrode group 10 is manufactured by coiling the positive electrode 11 and the negative electrode 12 many times around the circumferential surface of the winding core 15, with the interposition of the separators 13 and 14 between these two electrodes.

Then the negative electrode current collecting member 21 is fitted onto the lower portion of the winding core 15 of this electrode group 10. This fitting of the negative electrode current collecting member 21 is performed by fitting the opening portion 21b of the negative electrode current collecting member 21 over the stepped portion 15b provided upon the lower end portion of the winding core 15. Next, the negative leads 17 are put into close contact with the external circumference of the external circumferential cylinder portion 21c of the negative electrode current collecting member 21 while being distributed almost evenly therealong, and the pressure ring member 22 is fitted over the outside of the negative leads 17. And the negative leads 17 and the pressure ring 22 are welded to the negative electrode current collecting member 21 by ultrasonic welding or the like. Then the negative electrode power lead 23 is welded to the negative electrode current collecting member 21, so as to straddle the lower end surface of the winding core 15 and the negative electrode current collecting member 21.

Next, the lower cylinder portion 31b of the positive electrode current collecting member 31 is fitted into the stepped portion 15a that is provided at the upper end of the winding core 15. And the positive leads 16 of the positive electrode 11 are closely contacted to the outer surface of the upper cylinder portion 31c of the positive electrode current collecting member 31 while being distributed almost evenly therealong, and then the pressure member 32 is fitted around the external sides of the positive leads 16. And, using ultrasonic welding or the like, the positive leads 16 and the pressure ring 32 are welded to the positive electrode current collecting member 31. This completes the manufacture of the generating unit 20 shown in FIG. 2.

Next, the generating unit 20 that has been made according to the process described above is fitted into a cylindrical member that is made from metal and has a bottom, and that is of a size that can contain the generating unit 20. This cylinder member that has a bottom will become the battery cell container 2.

In the following, in order to simplify and clarify the explanation, this cylinder member that has a bottom will be described as being the battery cell container 2.

The negative electrode power lead 23 of the generating unit 20 that has thus been housed within the battery cell container 2 is now welded to the battery cell container 2 by electric resistance welding or the like. At this time, a electrode rod is passed through the opening portion 31e of the positive electrode current collecting member 31 and through the hollow central axis of the winding core 15, and the end of this electrode rod is contacted against the negative electrode power lead 23. And the negative electrode power lead 23 is pushed against the bottom portion of the battery cell container 2 by this electrode rod and is then welded there by the supply of electrical current.

Next, a portion of the battery cell container 2 at its upper end portion is pushed radially inwards by a squeezing process, so that the almost letter-V shaped groove 2a is formed upon the outer surface of the battery cell container 2.

This groove 2a in the battery cell container 2 is formed so as to be axially positioned at the upper end portion of the generating unit 20, or, to put it in another manner, is formed so as to be positioned in the neighborhood of the upper end of the positive electrode current collecting member 31.

A predetermined amount of an appropriate non-aqueous electrolyte is injected into the interior of the battery cell container 2, in which the generating unit 20 is held.

Next, one end portion of the connection member 35 is welded to the upper surface of the positive electrode current collecting member 31 by ultrasonic welding.

On the other hand, the anti-explosion mechanism 30 is manufactured in advance. As described above, the top cover 3 is received within the side portion 37b of the diaphragm 37, and the top cover 3 is fixed to the diaphragm 37 by swaging processing the side portion 37b. Then the external periphery of the connection plate 35 is fitted into the annular side edge portion 41b of the insulation plate 41. In this state, the projecting portion 35a of the connection plate 35 is joined to the diaphragm 37 by electric resistance welding or friction stir welding. It would also be acceptable to arrange to fix the insulation plate 41 to the connection plate 35, after having joined the projecting portion 35a of the connection plate 35 to the diaphragm 37.

The connection member 33 is laser welded to the lower surface 36a of the thinner portion 36 on the connection plate 35 included in the anti-explosion mechanism that has been manufactured in this manner. This is done by curving through approximately half a circle the other end portion of the connection member 33 after one end thereof has been welded to the upper surface of the positive electrode current collecting member 31, and then contacting the same side surface of that other end portion of this connection member 33 as the side that was welded to the positive electrode current collecting member 31 against the lower surface 36a of the thinner portion 36 of the connection plate 35. At this time, the connection member 33 can be curved simply and easily, since it is flexible because it is made from a plurality of layers of thin aluminum foil laminated together. And a laser is irradiated from the side of the connection member 33 upon the connection plate 35, so that welding is performed. The beam area over which the laser is irradiated is smaller than the area of the thinner portion 36a. The thinner portion 36 of the connection plate 35 undergoes thermal deformation due to the laser welding, and bulges upwards towards the diaphragm 37. However, since the upper surface of the thinner portion 36 is hollowed out in advance below the upper surface of the connection plate 35, accordingly it is possible to prevent the connection plate 35 from coming into contact with the diaphragm 37, as shown by the broken line in FIG. 4.

Next, the gasket 43 is fitted in above the groove 2a of the battery cell container 2. In this state, as shown in FIG. 2, the gasket 43 has a construction incorporating, above its annular base portion 43a, the external circumferential wall portion 43b that is perpendicular to the base portion 43a. With this construction, the gasket 43 is held within the interior of the portion that is above the groove 2a of the battery cell container 2. The gasket 43 is made from rubber, but this is not intended to be limitative; it could be made from any suitable material, for example from EPDM rubber. Furthermore, for example, the battery cell container 2 may be made from carbon steel of thickness 0.5 mm and may have an external diameter of 40 mm, while the thickness of the gasket 43 may be around 1.0 mm.

Next the anti-explosion mechanism 30, to which the connection member 33 has been connected, is held within the gasket 43. Due to this, the outer peripheral edge of the diaphragm 37 of the anti-explosion mechanism 30 is contacted against the external circumferential wall portion 43b of the gasket 43.

In this state, the portion of the battery cell container 2 between its groove 2a and its upper end surface is compressed by pressure, and the diaphragm 37 along with the gasket 43 are fixed to the battery cell container 2 along with the gasket 43 by a so called swaging process.

The manufacture of the cylindrical type secondary battery cell shown in FIG. 1 is completed in this manner.

CONCRETE EMBODIMENTS

Next, certain concrete embodiments of the anti-explosion mechanism that have been manufactured according to the embodiment described above will be explained. For the sake of comparison, a comparison example of an anti-explosion mechanism will also be described.

Embodiment 1

Upon a connection plate 35 of thickness 1.0 mm, a thinner portion 36 was formed having a flat lower surface 36a coplanar with the lower surface of its peripheral region upon the plate 35, and with its upper surface having a difference in level of 0.1 mm from the upper surface of its peripheral region. An anti-explosion mechanism 30 was manufactured using this connection plate 35, and a connection member 33 was joined to the lower surface 36a of the thinner portion 36 of the connection plate 35 by laser welding.

Embodiment 2

Upon a connection plate 35 of thickness 1.0 mm, a thinner portion 36 was formed having a flat lower surface 36a coplanar with the lower surface of its peripheral region upon the plate 35, and with its upper surface having a difference in level of 0.3 mm from the upper surface of its peripheral region. An anti-explosion mechanism 30 was manufactured using this connection plate 35, and a connection member 33 was joined to the lower surface 36a of the thinner portion 36 of the connection plate 35 by laser welding.

Embodiment 3

Upon a connection plate 35 of thickness 1.0 mm, a thinner portion 36 was formed having a flat lower surface 36a coplanar with the lower surface of its peripheral region upon the plate 35, and with its upper surface having a difference in level of 0.5 mm from the upper surface of its peripheral region. An anti-explosion mechanism 30 was manufactured using this connection plate 35, and a connection member 33 was joined to the lower surface 36a of the thinner portion 36 of the connection plate 35 by laser welding.

Embodiment 4

Upon a connection plate 35 of thickness 1.0 mm, a thinner portion 36 was formed having a flat lower surface 36a coplanar with the lower surface of its peripheral region upon the plate 35, and with its upper surface having a difference in level of 0.7 mm from the upper surface of its peripheral region. An anti-explosion mechanism 30 was manufactured using this connection plate 35, and a connection member 33 was joined to the lower surface 36a of the thinner portion 36 of the connection plate 35 by laser welding.

Comparison Example

An anti-explosion mechanism 30 was manufactured using a connection plate 35 of thickness 1.0 mm upon which no thin portion was made, and a connection member 33 was joined to the lower surface of the connection plate 35 by laser welding.

For each of the embodiments 1 through 4 and the comparison example, one hundred examples of the anti-explosion mechanisms 30 with attached connection member were manufactured and subjected to testing in a water pressure testing machine, and the intercepted pressure and the damage to the diaphragm 37 in the region where the connection member 33 was welded were checked.

The results of checking are shown in Table 1.

TABLE 1

|  | number of diaphragms passing test | number of ruptured diaphragms | number of poor welds |
| --- | --- | --- | --- |
| embodiment 1 | 100 | 0 | 0 |
| embodiment 2 | 100 | 0 | 0 |
| embodiment 3 | 100 | 0 | 0 |
| embodiment 4 | 70 | 30*$_1$ | ← |
| comparison example | 65 | 35 | 0 |

*$_1$damage due to laser breakthrough during welding

With all of the embodiments 1 through 3, satisfactory operation was obtained, and moreover there was no damage to the diaphragms.

However in the case of embodiment 4, during welding, sometimes the connection plate ruptured and became unserviceable. It is considered that this was because the connection plate was too thin.

Furthermore, with the anti-explosion mechanism of the comparison example, it was ascertained that in many cases the operational pressure was poor, and that the diaphragm suffered damage.

From the embodiments described above, it was confirmed that it is possible to prevent damage to the diaphragm, provided that the difference in level between the thinner portion 36 of the connection plate 35 and the upper surface of the connection plate 35 is greater than or equal to 0.1 mm.

Furthermore, it was confirmed that it is possible to prevent damage to the diaphragm, provided that the thickness of the thinner portion 36 of the connection plate 35 is greater than or equal to 0.5 mm, in other words that it is equal to or greater than the thickness of the connection member 33.

As described above, with the sealed battery cell of the present invention, the junction portion on the connection plate is formed in advance as a thin portion that is hollowed out more than the region around it. Due to this, even though the connection plate is deformed due to welding the connection lead to it, it is still possible to prevent the connection plate from coming into contact with the diaphragm. Since, in this case, the lower surface 36a of the thinner portion 36 of the connection plate 35 is flat and is substantially coplanar with the region around it on the lower surface of the connection plate 35, it is simple and easy to ensure an adequate predetermined clearance between the connection plate 35 in the neighborhood of the junction portion, and the diaphragm 37.

Variant Embodiments

Figure 5:
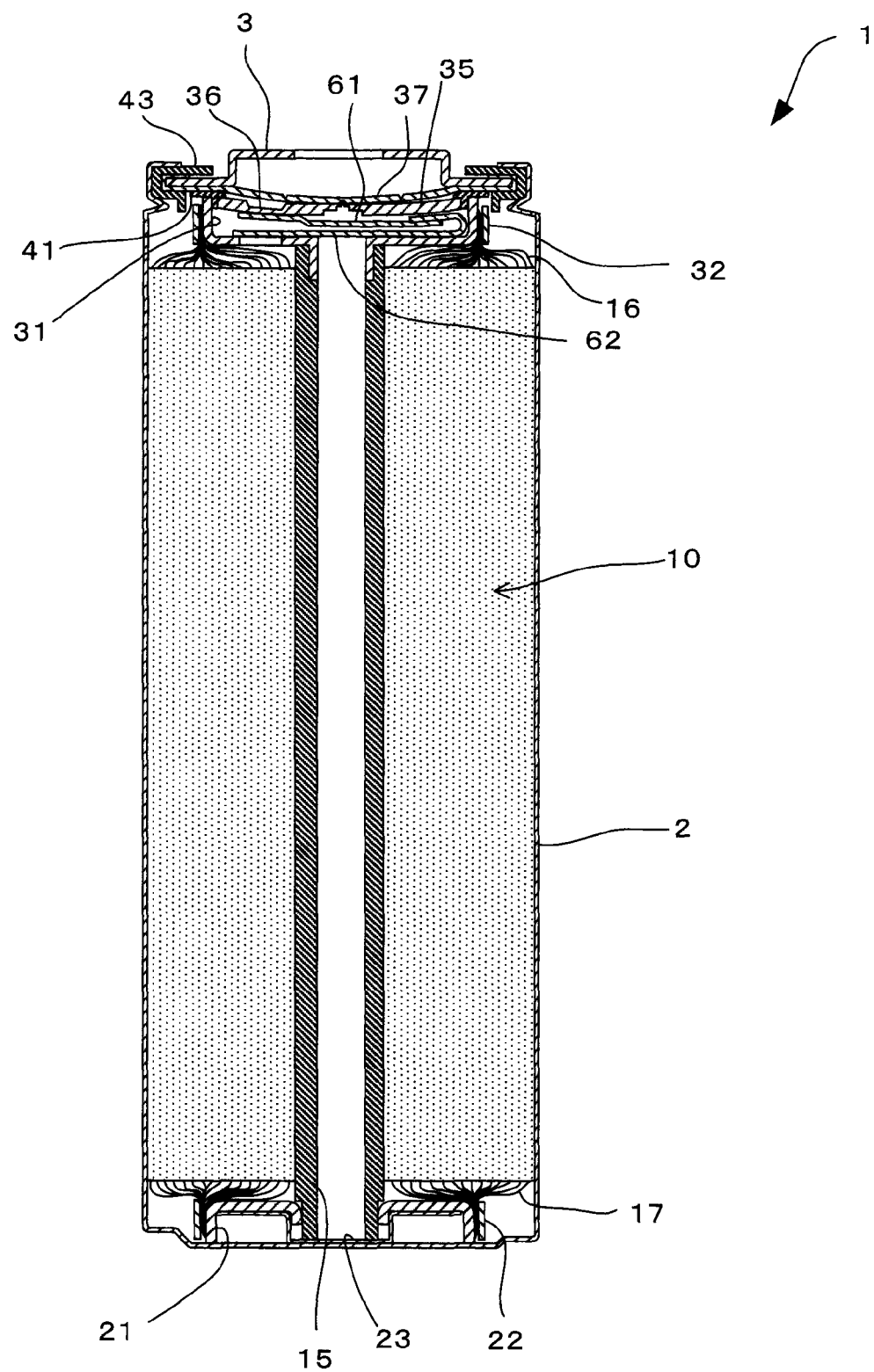
FIG. 5 is an enlarged sectional view showing a variant embodiment of the cylindrical sealed battery cell of the present invention.

In the embodiments described above, it was arranged for the positive electrode current collecting member 31 and the connection plate 35 to be connected together via the single connection member 33. By contrast, FIG. 5 shows a construction in which the positive electrode current collecting member 31 and the connection plate 35 are connected together using two connection members 61 and 62.

In the case of this construction, one end portion of the first connection member 61 is connected to the thinner portion 36 of the connection plate 35 by laser welding. Moreover, one end portion of the second connection member 62 is welded to the positive electrode current collecting member 31. This welding is not limited to being laser welding; it could also be performed using ultrasonic welding or electric resistance welding or the like. After the non-aqueous electrolyte has been injected into the battery cell container, 2, the other end portion of the first connection member 61 is welded to the other end portion of the second connection member 62. This welding also is not limited to being laser welding; it could be performed using ultrasonic welding or electric resistance welding or the like.

The other structural members are the same as in the case of the embodiment described above; to members that correspond to ones of the described embodiment the same reference symbols are appended, and description thereof will be omitted.

In the case of the structure shown for this variant embodiment, the welding of the connection members 61 and 62 and the injection of the non-aqueous electrolyte becomes simple and easy. However the electrical resistance also becomes somewhat greater, due to the facts that the number of welds becomes larger, and that the total length of the connection members becomes longer.

It should be understood that, in the embodiment described above, a case was explained in which the lower surface 36a of the thinner portion 36 that was formed upon the connection plate 35 was the same surface as that of (i.e. was coplanar to) the region surrounding it. However, it would also be acceptable to arrange to remove a portion of the lower surface of the thinner portion 36 by grinding away a certain amount from the lower surface of the connection plate 35, so that the lower surface 36a of the thinner portion 36 was formed in a hollowed-out shape, having a thickness at its interior that is less than that of the surrounding region.

Furthermore while an example was described of a lithium battery cell, as a representative of a cylindrical sealed battery cell, the present invention is not to be considered as being limited to the case of a lithium battery cell; it could also be applied to a nickel hydrogen battery cell, or to a nickel cadmium battery cell or the like, or to some other type of cylindrical sealed battery cell. Moreover, the present invention is not to be considered as being limited to the case of a cylindrical sealed battery cell; it could be applied to a sealed battery cell other than a cylindrical sealed battery cells, such as a square shaped secondary battery cell or the like.

Apart from the above possibilities, the cylindrical sealed battery cell of the present invention can be constructed in various other modified ways, provided that the scope of the gist of the present invention is adhered to. In other words, it will be sufficient for the sealed battery cell of the present invention to include, an anti-explosion mechanism disposed between an electrode group and a top cover, and that deforms or cleaves due to elevation of pressure internal to the battery cell, the electrode group being configured to a positive electrode and a negative electrode that are laminated together; wherein the anti-explosion mechanism comprises a diaphragm, a connection plate welded to the diaphragm, and a connection lead welded to the connection plate; and the connection plate comprises a thinner portion where a spot at which the connection lead is connected is formed as thin, and a thicker portion where the thinner portion is not formed, and a lower surface of the thinner portion is formed as coincident with a lower surface of the thicker portion, or as hollowed out from the lower surface of the thicker portion.

Moreover, it will be sufficient for a method of manufacturing a sealed battery cell according to the present invention to include: a process of manufacturing an anti-explosion mechanism in which a top cover, a diaphragm, a connection plate, and an insulation plate are integrated together in advance; a process of manufacturing an electrode group; a process of putting the electrode group into a cylindrical battery cell container that has a bottom; a process of connecting together the electrode group and the connection plate by a connection member; a process of injecting an electrolyte into the battery cell container; and a process of swaging the anti-explosion mechanism to the battery cell container via a gasket after injection of the electrolyte; wherein: a thinner portion for laser welding is formed on a first surface of the connection plate, the thinner portion being hollowed out by a predetermined area of the first surface facing the diaphragm; and the connection member is laser welded to a second surface of the thinner portion of the connection plate, the second surface being an opposite surface to the first surface of the connection plate.

The above described embodiments are examples, and various modifications can be made without departing from the scope of the invention.

What is claimed is:

1. A sealed battery cell comprising:
an anti-explosion mechanism disposed between an electrode group and a top cover, the electrode group including a positive electrode and a negative electrode that are laminated together; wherein
the anti-explosion mechanism comprises a diaphragm, a connection plate comprising a lower surface and an upper surface that is welded to the diaphragm, and a connection lead welded to the lower surface of the connection plate;
the connection plate includes a thinner portion having a flat upper surface across an entirety of the thinner portion, the flat upper surface being recessed below an upper surface of adjacent portions of the connection plate, the thinner portion being thinner than portions of the connection plate immediately adjacent thereto;
a lower surface of the thinner portion is coplanar with the lower surface of the portions of the connection plate immediately adjacent to the thinner portion, and comprises a welded portion where the connection lead is welded directly to the lower surface of the thinner portion; and
a thickness ratio between the thinner portion and a thickest portion of the connection plate is from 0.5 to 0.9.

2. A sealed battery cell according to claim 1, wherein
an area of the thinner portion is larger than a spot or a junction area at which the connection lead is welded.

3. A sealed battery cell according to claim 1, wherein
the thinner portion is formed to be 0.1 mm or more thinner than the thicker portion, and to be at least as thick as the connection lead.

4. A sealed battery cell according to claim 1, wherein
the anti-explosion mechanism further comprises an insulation plate; and the top cover, the diaphragm, the connection plate, and the insulation plate are integrated together in a state in which a peripheral part of the connection plate is fitted into the insulation plate.

5. A sealed battery cell according to claim 4, wherein the connection lead is laser welded to the connection plate while the top cover, the diaphragm, the connection plate, and the insulation plate are in an integrated state.

6. A sealed battery cell according to claim 1, wherein a central portion of the thinner portion bulges upward toward the diaphragm.

7. A sealed battery cell according to claim 1, wherein an area of the thinner portion is 2 mm×5 mm.

* * * * *